(12) United States Patent
Magette et al.

(10) Patent No.: US 11,162,609 B2
(45) Date of Patent: Nov. 2, 2021

(54) FLUID VALVE

(71) Applicant: SAFRAN AERO BOOSTERS S.A., Herstal (BE)

(72) Inventors: Arnaud Luc Charles Magette, Saint Jean Sart (BE); Maxime Vandenbroucke, Hermée (BE); Cédric Louis Marie Ghislain Frippiat, Theux (BE); Jean-Christian Bomal, Melen (BE)

(73) Assignee: SAFRAN AERO BOOSTERS S.A., Herstal (BE)

( * ) Notice: Subject to any disclaimer, the term of this patent is extended or adjusted under 35 U.S.C. 154(b) by 0 days.

(21) Appl. No.: 17/041,774

(22) PCT Filed: Mar. 27, 2019

(86) PCT No.: PCT/EP2019/057793
§ 371 (c)(1),
(2) Date: Sep. 25, 2020

(87) PCT Pub. No.: WO2019/185755
PCT Pub. Date: Oct. 3, 2019

(65) Prior Publication Data
US 2021/0048111 A1    Feb. 18, 2021

(30) Foreign Application Priority Data

Mar. 28, 2018    (BE) .................................... 2018/5206

(51) Int. Cl.
*F16K 31/42*    (2006.01)
*F16K 11/07*    (2006.01)
(Continued)

(52) U.S. Cl.
CPC ........ *F16K 31/426* (2013.01); *F15B 13/0435* (2013.01); *F16K 11/0716* (2013.01);
(Continued)

(58) Field of Classification Search
CPC ............. F16K 11/0716; F16K 31/1221; F16K 31/1223; F16K 31/1225; F16K 31/1226; F16K 31/426; F15B 13/0435
See application file for complete search history.

(56) References Cited

U.S. PATENT DOCUMENTS 2,615,466 A    10/1952    Garde
4,445,528 A *    5/1984    Miki ..................... F16K 31/426
                                                    137/315.03

(Continued)

FOREIGN PATENT DOCUMENTS

DE    1188398 B    3/1965
DE    19632368 A1    2/1998

OTHER PUBLICATIONS

Written Opinion of the International Searching Authority dated Jul. 5, 2019, issued in corresponding International Application No. PCT/EP2019/057793, filed Mar. 27, 2019, 7 pages.

(Continued)

*Primary Examiner* — Umashankar Venkatesan
(74) *Attorney, Agent, or Firm* — Christensen O'Connor Johnson Kindness PLLC

(57) ABSTRACT

A fluid valve for a hydraulic circuit of an aircraft includes a valve body with an inlet and two outlets. The valve further includes a solenoid electric actuator with a ferromagnetic mobile driver and a valve member having a ferromagnetic portion/ The valve member is movable within the valve body along a main direction and has first and second ends that define first and second cavities, respectively, on opposite sides of the valve member. A longitudinal cavity extends through the valve member parallel to the main direction and opens into the second cavity. Relative displacement between the mobile driver and the valve member modifies a communication between the longitudinal cavity and the first cavity via a side opening that is perpendicular to the main direction.

15 Claims, 2 Drawing Sheets

(51) Int. Cl.
  *F16K 31/122* (2006.01)
  *F15B 13/043* (2006.01)

(52) U.S. Cl.
  CPC ...... *F16K 31/1221* (2013.01); *F16K 31/1223* (2013.01); *F16K 31/1225* (2013.01); *F16K 31/1226* (2013.01)

(56) References Cited

U.S. PATENT DOCUMENTS

| | | | | |
|---|---|---|---|---|
| 5,236,015 A | * | 8/1993 | Schwelm | F15B 13/043 137/625.18 |
| 5,350,152 A | * | 9/1994 | Hutchison | F15B 13/043 137/625.64 |
| 9,080,687 B2 | * | 7/2015 | Franconi | F16K 1/126 |
| 2004/0163721 A1 | | 8/2004 | Cotton, III et al. | |
| 2005/0218362 A1 | * | 10/2005 | Furuta | F16K 11/0716 251/129.15 |
| 2009/0224192 A1 | * | 9/2009 | Oikawa | F16K 11/0716 251/129.15 |
| 2010/0308244 A1 | * | 12/2010 | Oikawa | F16K 31/0675 251/129.15 |
| 2017/0037984 A1 | * | 2/2017 | Frippiat | F16K 31/423 |
| 2018/0094745 A1 | * | 4/2018 | Frippiat | F16K 31/408 |

OTHER PUBLICATIONS

International Preliminary Report on Patentability dated Sep. 29, 2020, issued in corresponding International Application No. PCT/EP2019/057793, filed Mar. 27, 2019, 1 page.
International Search Report dated Jul. 5, 2019, issued in corresponding International Application No. PCT/EP2019/057793, filed Mar. 27, 2019, 5 pages.
Written Opinion of the International Searching Authority dated Jul. 5, 2019, issued in corresponding International Application No. PCT/EP2019/057793, filed Mar. 27, 2019, 6 pages.

* cited by examiner

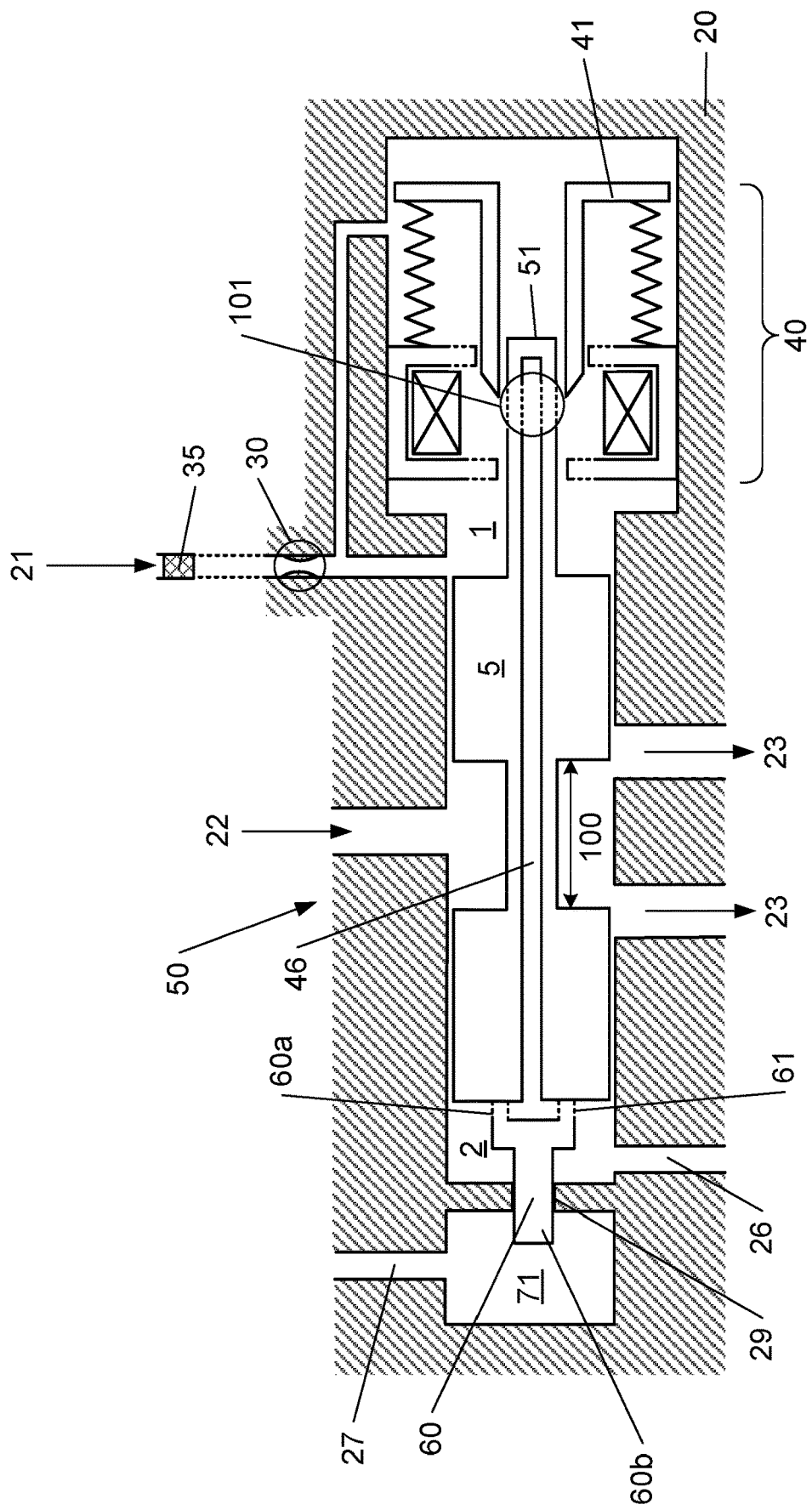

FLUID VALVE

TECHNICAL FIELD

The invention relates to a proportional fluid valve, e.g. a three-way valve.

BACKGROUND

US2004/0163721A1 describes a fluid valve comprising a solenoid electric actuator. By injecting an electric current into the solenoid actuator, a driver called a push pin can be moved from a first position to a second position. This driver, which is not ferromagnetic in US2004/0163721A1, is connected to a ferromagnetic armature. A mobile valve member is connected to the driver and controls the passage of fluid between the inlet and outlet channels of the fluid valve. US2004/0163721A1 states in particular in the paragraph [0015] that the valve member is capable of moving in a manner equivalent to the driver.

The valve described in US2004/0163721 A1 has disadvantages. For some applications, it is desirable that the valve member can describe a large movement or stroke. A large stroke of the valve member allows proportional control of larger flow rates. This is because, if a large flow rate is to be controlled over a short stroke, sensitivity would be lost (the same millimetre of stroke would represent a larger flow rate delta). Furthermore, if the stroke is not sufficient, the valve member could induce (even when the valve is fully open) excessively large pressure drops. However, the aim is generally to limit the pressure drop across the valve and the stroke must therefore be adapted to the flow rate passing through the valve. The applications for which it is better to adopt large strokes are therefore high flow rate proportional control applications (for example from 1500 L/h upwards).

For the valve of US2004/0163721 A1, some large strokes may become unreachable. On the other hand, with this known system, as the required stroke of the valve member increases, the mass of the entire fluid valve increases. Large strokes require a large valve member and/or a large driver. This increases the weight of the fluid valve. On the other hand, if the mobile elements (valve member and driver) are large, then a solenoid (or coil) of the actuator must generally be provided which is large enough to move them: a device must be provided which can create a large force on the driver. It is then often necessary to inject a sufficiently large electric current into the solenoid in order to generate a sufficiently large magnetic field to move mobile elements such as the driver.

U.S. Pat. No. 2,615,466 describes a fluid valve operated indirectly by a magnetic actuator external to the valve body. The magnetic actuator, by modifying the position of the driver, modifies the pressures around the valve member, causing it to actuate.

DE 196 32 368 A1 describes a valve comprising a driver located in the valve member. The displacement of the driver inside the valve member by means of a magnetic actuator changes the pressures around the valve member causing it to actuate.

DE 1 188 398 describes a valve comprising a driver, the driver being in a longitudinal cavity of the valve member such that displacement of the driver causes a change in pressure in the longitudinal cavity of the valve member.

However, for some applications, such as aeronautical, it is desired to have a valve of limited size and weight and/or to be able to use limited current through the solenoid.

SUMMARY OF THE INVENTION

According to a first aspect, one of the purposes of the present invention is to provide a proportional fluid valve with an electric actuator, the valve member of which can describe a large stroke while limiting the size and mass of the valve, and, the current required in the electric actuator.

For this purpose, the inventors propose the following fluid valve.

A fluid valve for a hydraulic circuit of a piece of equipment of an aircraft and comprising:
  a hollow valve body comprising an inlet, two outlets and a communication to an external pressure;
  an solenoid electric actuator located in the hollow of the hollow valve body and comprising a ferromagnetic mobile driver;
  a valve member mobile in the valve body according to a main direction to at least partially block a passage between said inlet and one of the two outlets,
  said valve member:
  comprising a first and a second ends,
  at least partially defining a first and a second cavities located on either side of said valve member in the hollow of the valve body, said first, respectively second cavity being adjacent to said first, respectively second end, said first cavity being connected to said external pressure via said communication,
  said valve member comprising a longitudinal cavity extending parallel to said main direction and opening into said second cavity,
  a fixed restriction in said communication,
  characterized in that
  at least one portion of the valve member comprises a ferromagnetic material, the solenoid electric actuator surrounding at least one portion of the valve member for one or more positions of said valve member during normal operation of the valve, in that
  said valve member comprises at least one side opening substantially perpendicular to said main direction for putting in communication said longitudinal cavity with said first cavity, said longitudinal cavity not opening into said first cavity at its first end, and in that
  the fluid valve is configured such that a relative displacement between said mobile driver and said valve member is capable of modifying a communication between said longitudinal cavity and said first cavity via said at least one side opening.

An engineering effect of the solenoid electric actuator surrounding at least one portion of the valve member is to make the valve of the invention more compact and less heavy. A valve with an solenoid electric actuator and a valve member being interleaved so as to obtain a more compact valve; a more compact valve allows for the reduction of the mass of the valve body.

The driver therefore acts as a variable restriction depending on its position relative to the valve member. The variable restriction is therefore a function of the degree of communication between the longitudinal cavity and the first cavity, the degree of communication depending on the position of the mobile driver relative to the valve member.

With the fluid valve of the invention, displacement of the driver induces a pressure difference between the first and second cavities due to the modification in the degree of communication between them. This pressure difference gives rise to a displacement force on the valve member. If this force is sufficient, it allows the valve member to be moved in the main direction. As illustrated in the following, it is possible to achieve a large displacement of the valve member for a small displacement of the driver relative to the valve member. The force applied by the solenoid on the driver can be kept low while a large displacement of the valve member is possible at the same time. This is because a small displacement of the driver, regardless of the position of the valve member, allows a large movement of the valve member. This is particularly possible due to the bi-driver aspect of the valve of the invention, i.e. the fact that the valve member comprises a ferromagnetic material and the fact that the valve of the invention is configured so that a relative displacement between the mobile driver and the valve member is able to induce a pressure difference between the first and second cavities, inducing a displacement of the valve member which can be large.

In a somewhat more detailed manner, even a small displacement of the driver induced by a small force can create a pressure difference between these two cavities that is sufficient to move the valve member through a large stroke. Thus, the driver does not have to describe a large displacement to have a large stroke of the valve member and there is no need to apply a large force on the driver. The size of the driver can therefore be reduced, allowing a fluid valve of limited weight. Because the driver is small, a very powerful electric actuator is not required. Therefore, its size (and therefore its weight) can be reduced, as well as the current injected to move the driver.

The fluid valve of the invention allows precise control of large flow rates of fluid because it is the pressure difference between the first and second cavities, imposed by the relative position of the driver with respect to the valve member, that results in the control of fluid flow rates. Thus the displacement of the valve member is ensured by the pressure difference between the first and second cavity; the displacement of the driver allows the control of this pressure difference. The control of this pressure difference by the displacement of the driver relative to the valve member therefore requires the generation of a small displacement force (compared to the force generated on the valve member by the pressure difference). In this way, it is possible to have good accuracy in controlling large fluid flow rates with a small solenoid electric actuator powered by limited electrical current.

The valve member is drilled with a longitudinal hole allowing to put in communication said first and second cavities when the variable restriction defined by the communication between the longitudinal cavity and said first cavity is not blocked. The opening(s) perpendicular to the main direction allow(s), when not blocked by the mobile driver, to establish communication between the longitudinal cavity and the first cavity. The invention allows a movement of the mobile valve member that is independent of a variation in the reference pressure. Preferably, the pressure in the first cavity is a high pressure and the pressure in the second cavity is a low pressure.

The first cavity, respectively the second cavity are adjacent to or in contact with said first end, respectively the second end of the valve member. In contact means that a fluid present in the first cavity, respectively the second cavity is in contact with said first end, respectively the second end of the valve member. Thus, a fluid at a given pressure in contact with the first or second end can apply its pressure to the first or second end.

The valve of the invention, during its operation, sees a flow of fluid between the first cavity and the second cavity via the longitudinal cavity drilled in the valve member. Preferably, the first cavity is subjected to a higher pressure than the second cavity. Due to the variable restriction controlled by the relative movement of the mobile driver with respect to the mobile valve member, the flow between the first and the second cavity can be adjusted. By modifying the flow between these two cavities, the pressure in these two cavities can be modulated, thereby creating displacement forces on the mobile valve member. Because of the position of the mobile driver with respect to the perpendicular openings making it possible for the fluid to flow between the first cavity and the longitudinal cavity, the invention provides a mobile driver which is not or hardly influenced by the pressure differences between the first cavity and the second cavity. As the driver is completely submerged in the fluid of the first cavity, it is always subject to the pressure of the first cavity, so that a change in the pressure in the first and/or the second cavity applies no or little force on the driver of the invention. The driver of the invention is then balanced because it is subjected to pressure-related forces which are homogeneous on all its faces. The pressure in the second cavity can be felt through the perpendicular openings in the first cavity, but due to the geometry, the forces created at these openings, because they are essentially perpendicular to the main direction, have little or no interaction with the driver. It can also be said that the mobile driver of the invention is stabilized. Thus, the position of the mobile driver of the invention is independent of the pressure of the first cavity as well as of the pressure of the second cavity.

Preferably, a fixed restriction in said communication allows a displacement of said mobile driver to induce a pressure variation in one of said first and second cavities to create a displacement force on said valve member to vary a fluid flow rate between the inlet and both outlets.

The side opening in said valve member is substantially perpendicular to said main direction, i.e. an axis passing substantially through the centre of a side opening is perpendicular to said main direction.

The longitudinal cavity not opening into said first cavity at its first end, means that there is a wall at the first end to block the longitudinal cavity. The wall blocking the longitudinal cavity prevents a flow at the first end. Thus, the longitudinal cavity is closed on the external side of the first end and the longitudinal cavity is not opening into the first cavity according to a direction parallel to the main direction that can be described by the valve member.

The fluid valve is configured such that a relative displacement between the mobile driver and the valve member is capable of modifying a communication between the longitudinal cavity and the first cavity via the at least one side opening. The relative movement of the driver with respect to at least one side opening is a variable restriction. Preferably, modifying a communication between the longitudinal cavity and the first cavity means modifying a degree of communication between these two elements.

Preferably, the solenoid electric actuator surrounds the at least one portion of the valve member comprising a ferromagnetic material, for one or more positions of said valve member during normal operation of the valve.

The technical effect of the solenoid electric actuator surrounding the at least one portion of the valve member comprising a ferromagnetic material is to allow a precise relative position between the valve member and the driver to be imposed. It is the relative position between the ferromagnetic portion of the valve member and the ferromagnetic mobile driver that enables control of the communication between the longitudinal cavity and the first cavity via said the at least one side opening during normal operation of the valve.

Contrary to prior art documentation, this embodiment allows precise control of the communication between said longitudinal cavity and said first cavity for a large range of displacement of the valve member during normal operation of the valve. The position of the driver (and therefore of the valve member) is therefore substantially the result of the magnetic force of the actuator on the driver. Thus, the magnetic circuit primarily "sees" the relative position of the driver with respect to the valve member and does not "see" the spatial position of the valve member and/or driver during normal operation of the valve.

An advantage of this embodiment is that the portion of the valve member made of magnetic (preferably ferromagnetic) material is not intended to make the actuator capable of applying a direct displacement force on the actuator, but simply to make the magnetic circuit "mobile" with the valve member (as if the actuator were "shipped" on the valve member) to reduce the "magnetic" stroke required by the actuator. Such a reduction in the stroke required for the actuator to reach one or more positions of the valve member (due to the relative displacement of the driver with respect to it) results in a gain in size, weight, and power consumption of the solenoid actuator.

Finally, the fluid valve according to the invention has the following properties and advantages:
- allows to have a valve member with a large stroke while limiting the relative displacement of the driver with respect to the valve member, it allows the control of the relative position of the driver with respect to the valve member over a large stroke but with a relatively small solenoid electric actuator, the weight of the fluid valve and the current required in the electric actuator being thus reduced.
- the invention may be viewed as a valve allowing the generation of a magnetic force combined with the action of a spring to position a driver (capable of controlling a variable restriction). The magnetic force is applied between 2 mobile pieces, the driver and a part of the spool (hence the name bi-driver or bi-plunger).
- the magnetic force results from a relative movement of the driver and the valve member (relative approach or separation), for example due to a reduction in reluctance, this relative movement causes a variation in restriction (variable restriction) and therefore a variation in pressures on either side of the valve member. This leads to an imbalance of force on the valve member, which moves until the balance of force is restored (when the pressures are balanced again), i.e. when the variable restriction has almost returned to its original dimension, i.e. when the relative position between the valve member and the plunger has returned to its original value. In reality, the return to the initial dimension should be considered as an approximation and the position of the feedback medium (spring or hydraulic) and the differences in flow forces applied to the valve member (due to its new position) should be taken into account, often the differences in forces (feedback, flow force) can be neglected. The embodiment including hydraulic feedback is therefore to be preferred for greater balance and stability of the fluid valve of the invention.
- the valve uses the principle of counteraction: the solenoid actuator forces a modification of a characteristic of the system (variable restriction), causing an imbalance, to which the system reacts so as to restore the characteristic to its value allowing the system to be balanced. In this way, the valve member precisely follows the position of the driver and it is then only necessary to position the driver (with a reduced need for force). Thus the relative position of the driver with respect to the valve member is always the same because both pieces are mobile.
- the position of the driver (and thus the valve member) results from the combination of the magnetic force of the actuator and the spring force of the driver. Thus, the magnetic circuit only "sees" the relative position of the driver with respect to the valve member and does not "see" the spatial position of the valve member and/or the driver.
- the fact that a part of the valve member is made of magnetic material (preferably ferromagnetic) is not intended to make the actuator capable of applying a direct force on the valve member, but simply to make the magnetic circuit "mobile" with the valve member (much as if the actuator were "shipped" on the valve member) to reduce the "magnetic" stroke.
- the fluid valve of the invention provides positional servo-control of a valve member to allow proportional control between at least three ways.
- the invention allows a reduced stroke at the actuator (even if the total stroke of the plunger and of the valve member remains high, the actuator only "sees" the relative stroke.

The advantage of the two-driver balanced valve of the invention over a single-driver valve is, in particular is to allow a large stroke of the valve member for a small amount of driver displacement while having a balanced valve. Thus, in the case of a single-driver valve, the magnetic force is applied between the driver and a fixed magnetic piece (solenoid actuator), which implies that the driver must complete the full stroke of the valve member, the "magnetic" stroke of the driver in relation to the solenoid actuator is therefore large. In the two-driver case of the invention, the magnetic force is applied between two mobile pieces, i.e. both the driver and the valve member. The solenoid actuator must therefore only be able to perform the relative stroke between the two pieces (shorter), whereas the assembly (valve member+plunger) can perform a larger stroke without impacting the solenoid actuator, which can therefore allow the use of a smaller, lighter solenoid actuator. The invention enables a large displacement of the valve member to be achieved with a relatively small solenoid actuator. For example, the solenoid actuator should be dimensioned so that it can allow the displacement according to the relative stroke of the driver and valve member.

The magnetic force created by exposing the mobile driver and the mobile valve member to the magnetic field generated by the solenoid attracts or repels the mobile driver and/or the mobile valve member relative to each other, thereby generating relative displacement of these two mobile elements in the main direction. The use of a bevelled shape of the driver allows good linearity of movement of the driver relative to the valve member. Exposure to the magnetic field of the driver and the valve member tends to cause the system to move towards a decrease in its reluctance.

Preferably when the mobile driver and the mobile valve member are subjected to the magnetic field of the solenoid, the relative displacement force allows in particular a displacement of the mobile driver relative to the valve member because the mobile driver has less inertia than the valve member and is subjected to fewer forces. This is because, the valve member is connected to a feedback means connecting the second end of the valve member to a wall of the second cavity. The valve member is also subject to the flow forces between the inlet and the two outlets as well as the flow forces in the longitudinal cavity passing through it. Because the mobile driver is balanced, it is always able to react to the magnetic field of the solenoid in the same way when subjected to the magnetic field, regardless of, for example, the pressure in the first cavity, the pressure in the second cavity, or the pressure difference between the first and second cavities.

Preferably, the fluid valve of the invention is configured such that a pressure force capable of being applied on the mobile driver in a direction parallel to the main direction results solely from a pressure within the first cavity. This has the advantage of having a stabilized driver which cannot be influenced by the pressure in the second cavity, or at least negligibly so.

In a special embodiment, a portion of the valve member comprises a ferromagnetic material and the solenoid electric actuator is capable of applying a magnetic displacement force on said ferromagnetic portion of the valve member. In this case, the solenoid electric actuator can be characterized as a two-driver or two-plunger actuator. When an electric current flows through the solenoid, the driver and the valve member move closer together to reduce the reluctance and thus the magnetic energy. However, as a result of this displacement, pressure differences between the first and second cavities are created which allow the valve member to be moved in the opposite direction in general, ultimately resulting in a significant displacement of the valve member.

Preferably, the fluid valve of the invention comprises a spring such that the second end of the valve member is connected to the valve body via said spring.

Another advantage of the invention is that the driver is balanced with respect to the pressure in the first cavity, so that it is not influenced by the pressure in this cavity. Due to the balancing of the driver in the first cavity, a pressure variation induced by a modification in the variable restriction defined by the communication between the longitudinal cavity and said first cavity has no or only very little influence on the position of the driver. Thus the fluid valve of the invention is defined as a balanced valve which allows a variation in the position of the valve member caused by a variation in the position of the driver, without the driver being subjected to the variation in pressure between the first and second cavities. The advantage of a balanced valve is that it allows very good control of the valve member position with relatively short response times and does not require a stabilization transition period.

With the fluid valve of the invention, it is possible to have large displacements (or large strokes) of the valve member, even if the driver describes a small displacement. Preferably the displacement of the driver relative to the valve member should be considered a relative displacement. This is because a displacement of the driver causes a displacement of the valve member as well as its own displacement. Thus, a large displacement of the valve member and the driver can be achieved for a very small displacement generated by the solenoid actuator. The fluid valve according to the invention can therefore be seen as a booster valve. Generally, from 4 mm stroke of the valve member, a person skilled in the art speaks of a large stroke. The mass of the valve of the invention may be less than 2 kg. Preferably, it can be as low as 1.5 kg or even as low as 1 kg.

With the fluid valve of the invention, a displacement of the valve member is not necessarily identical to the displacement of the driver which induces the displacement of the valve member, in particular at the time of the actuation of the driver. For the fluid valve of the invention, the driver and the valve member are not mechanically connected. For example, the driver and the valve member are not in contact but allow the modulation of the variable restriction by blocking more or less side openings of the valve member by the displacement of the driver.

In a preferred embodiment, the fluid valve also comprises:
a third cavity having a communication for fluidically connecting it to a third pressure, and
a piston mechanically coupled to the valve member and having a first part and a second part, the first part being in the second cavity, and the second part being located at least partially in the third cavity, so that a displacement of said mobile driver induces a pressure variation in the first cavity to create a displacement force on said valve member to vary a fluid flow rate between the inlet and the two outlets.

An advantage of this preferred embodiment is to provide a fluid valve such that the restoring force being applied on its valve member is independent of the position of the valve member.

In the fluid valve according to the invention, the pressure in the longitudinal hole is equal to the pressure in the second cavity. A displacement of the driver enlarges or narrows the fluid communication between the longitudinal hole and the first cavity. Consequently, this displacement changes the pressure in the first cavity. In other words, displacement of the driver changes the pressure difference between the first and second cavities. This pressure difference creates a displacement force on the valve member. If this force is sufficient relative to the restoring force being applied on the valve member, it will move the valve member.

In the fluid valve according to the invention, the pressure in the second cavity creates a force on the valve member and the first part of the piston, and the pressure in the third cavity creates a force on the second part of the piston. The restoring force on the valve member is due to the resultant of these two forces. Since the second cavity is connected to a second pressure and the third cavity is connected to a third pressure, the pressures in the second and third cavities are independent of the position of the valve member. Therefore, the resultant of the forces is independent of the position of the valve member.

The fluid valve according to the invention can be said to be "with hydraulic feedback".

The communications enable cavities to be fluidly connected to external cavities containing fluids at a given pressure or reference pressure. Each communication can connect a cavity at the same or different external pressures.

The first, second and third pressures are preferably external pressures. The first, second, and third communications are preferentially located at least partially in the valve body. The third pressure is preferentially different from the second pressure. The third pressure is preferentially higher than the second pressure. The third pressure is preferably equal to the first pressure. Preferably, the second communication has no fixed restriction. The pressure in the second cavity is preferentially equal to the second pressure. Preferably, the third communication has no fixed restriction. The pressure in the third cavity is preferably equal to the third pressure.

The first part of the piston is preferentially attached to the valve member.

The actuator of the fluid valve of the invention can be described as submerged. Thus, while the fluid valve of the invention is capable of controlling a flow rate of oil, the actuator is immersed in oil when the fluid valve is in operation.

Preferably, the third cavity is located in the hollow of the valve body.

Preferably, the first communication opens into the first cavity.

Preferably, the fluid valve comprises a spring connecting said driver to said solenoid actuator such that said force of said spring is adapted to at least partially change said communication between said longitudinal cavity and said first cavity via said at least one side opening.

Preferably, a displacement of the mobile driver in one direction of said main direction is able to modify said communication between said longitudinal cavity and said first cavity via said at least one side opening causing pressure variations in said first and second cavities such that it generates a displacement of said valve member in said direction.

For example, a displacement of the driver to the left causes a displacement of the valve member to the left. For example, a displacement of the driver to the right causes a displacement of the valve member to the right.

Preferably, the solenoid electric actuator comprises at least one coil, and a portion of said mobile driver located between said valve member and said at least one coil substantially defines a bevelled shape, so that it is able to modify said communication between said longitudinal cavity and said first cavity via said at least one side opening.

The advantage of such a bevelled shape or truncation of the part of the driver allowing to modify the variable restriction between the mobile driver and the mobile valve member is to have a better linearity of the displacement force applied by the coil as a function of the current sent to the coil and thus to have, in fine, a better control of the displacement of the mobile driver relative to the valve member. Another advantage of having such a bevelled shape at the perpendicular openings of the valve member is that the driver is less willing to be subjected to a force originating from a modification in pressure in the first or second other cavity.

Preferably:
said valve body comprises two communications, each of which is capable to fluidly connect the hollow of the valve body with an external pressure, and in that
said fluid valve comprises a fixed restriction in each communication so that displacement of said mobile driver induces a pressure variation in each of said first and second cavities to create a displacement force on said valve member to vary a fluid flow rate between the inlet and the two outlets.

The magnitude of the fixed restriction can be described as follows: the displacement of the valve member being caused by a pressure difference between the first and second cavities requires that the pressure in the first cavity can be modified. In the operation of the proportional fluid valve of the invention, there is a flow of fluid between the reference communications through the first cavity, allowing the pressure in the first cavity to be controlled by means of actuation of the driver (the displacement of the driver can be equated to a variable restriction). This pressure control is only possible due to the presence of the fixed restriction in the communication because the fixed restriction allows the pressure in the first cavity not always to be equal to the pressure HP or MP imposed at the inlet of the communication. This is because, a first cavity connected to an external pressure by a communication without a fixed restriction would always be at the external pressure and could therefore not undergo any controlled variation for a constant external pressure. When the driver is actuated, the fixed restriction causing a variation of the pressure in the first cavity, causing a displacement of the valve member.

For all the embodiments of the invention and in particular concerning the fixed restrictions, it is necessary to consider a dynamic approach to the proportional fluid valve of the invention, i.e. with an uninterrupted fluid flow (between the inlet and the outlets and between the reference communications) rather than a static approach in order to grasp the essential aspect of the fixed restriction as well as the variable restriction to create a displacement force on the valve member.

Preferably, the fluid valve comprises a spring and one end of said valve member is connected to said valve body via said spring.

A fluid valve according to any of the preceding claims characterized in that said driver is connected to a spring.

An alternative embodiment provides that the fluid valve is configured such that a displacement of said mobile driver induces a pressure variation to create a force on said driver in a direction opposite to said displacement.

The solenoid type electric actuator of the fluid valve according to the invention does not require a large supply current, even if it is desired that the valve member describes large strokes. For example, a current of 0 to 100 mA can be used on a bus 16-29 VDC, preferably of the EEC-FADEC type. A small amount of electrical power may therefore be sufficient to move the valve member over a large stroke. The fluid valve of the invention is not of the 'Direct Drive' type. The terms 'inlet' and 'outlet' of the hollow valve body could be interchanged. This is dependent only on the direction of flow of the fluid whose flow rate is controlled by the valve of the invention. Thus, the valve body could contain two inlets and one outlet. Similarly, the valve body could contain more than one inlet and more than two outlets. It is possible to reverse the inlets and outlets and vice versa.

Displacement force means a force that has a orientation and a direction along a possible direction of displacement of the mobile valve member. The driver is sometimes referred to as a plunger by a person skilled in the art. The communications are able to put in communication the hollow of the hollow valve body and, in particular, the first and second cavities with one or more reference pressures. The term 'fixed restriction' is familiar to a person skilled in the art. Different types of fixed restriction can be considered. A non-limiting example is a circular orifice drilled in a wall whose thickness is of the same order of magnitude as its diameter. Other examples are a bend, a diameter constriction.

The fluid valve of the invention has other advantages. It may be less expensive than other existing solutions having such a displacement of the valve member. It also has good performance. Generally, existing hydraulically amplified valves (servo valves) cannot be applied to large strokes. If a large flow rate is passed through an existing servo valve, its performance will be affected (loss of resolution, increased pressure drop). With the stabilized valve of the invention, it is possible to obtain amplification with good performance (resolution, precision, repeatability). Thus, with the stabilized valve of the invention, it is possible to have the following characteristics: open-loop accuracy of 10% on the position of the valve member, resolution of 5% on the position of the valve member, repeatability of 2% on the position of the valve member. In addition, the valve according to the invention is particularly simple and does not require complicated shaped elements. The principle of amplification of the movement of the valve member can be applied to relatively large displacements. The interface of the actuator can be a computer signal type control (e.g. EEC-FADEC). The fluid valve according to the invention can be used in many applications: in an engine of an aircraft for example, but not only.

The fluid valve of the invention is a proportional valve, a term known to the person skilled in the art. As a result, the passage between the inlet and each of the two outlets can be controlled over the entire stroke range of the valve member. The valve of the invention is therefore not simply an ON-OFF valve, unlike the valve described in U.S. Pat. No. 4,445,528 (for the latter, there is a pressure drop in a cavity rather than a gradual variation in pressure). With the valve of the invention, there are an infinite number of stable positions for the valve member: it therefore allows real control of the fluid flow rate between the inlet and the two outlets, unlike U.S. Pat. No. 4,445,528 (this is possible by real control of the pressure in the first and/or second cavity). The electric actuator of the fluid valve of the invention can be described as submerged, unlike the valve of U.S. Pat. No. 2,526,709. Thus, while the fluid valve of the invention is capable of controlling a flow rate of oil, the electric actuator is submerged in oil when the fluid valve is in operation.

In a possible variant, the valve body comprises two communications, each of which is adapted to fluidly connect the hollow of the valve body with one or two external pressures, and the fluid valve comprises one or two fixed restrictions in (or at) one or both of the communications so that a displacement of said mobile driver induces a pressure variation in each of said first and second cavities to create a displacement force on said valve member to vary a fluid flow rate between the inlet and both outlets.

As a communication thereby fluidly connecting the hollow of the valve body to an external cavity comprising a fluid which has a given pressure. Each communication can connect the hollow to the same external pressure or to two different external pressures. With this preferred embodiment, the control of the movement of the valve member is even better and the amplification of the force acting on it can be greater.

Preferably, the fluid valve of the invention is configured so that a displacement of said mobile driver induces a pressure variation to create a force on said driver in the opposite direction to said displacement. This provides a more stable fluid valve because a force is applied on the driver in the opposite direction to its displacement.

The communication to a reference pressure opening into the first cavity allows a constant pressure at said mobile driver regardless of its position. This corresponds to a balanced version of the fluid valve. Preferably, the second cavity is connected to a downstream pressure. The fixed restriction may comprise a passage (or communication or machining clearance) between the driver and a surrounding cylindrical wall. Such a cylindrical wall is an inner wall of the valve body where the solenoid electric actuator is located.

The driver may be connected to a spring.

According to one possible embodiment said valve member is drilled with a longitudinal hole which allows to put in communication said first and second cavities to communicate when the valve member is not blocked. Then said driver is preferably configured such that it is capable of modifying a degree of communication between the longitudinal cavity of the valve member and the first cavity. In this case, said driver is preferably located in said first cavity and said communication is adapted to allow communication between said first cavity and said external pressure (or reference pressure) which is then preferably high pressure. Preferably, the second cavity is then in communication with a low pressure.

Preferably, said communication to said external pressure comprises a filter. This makes it possible to meet a need for clean fluid.

Preferably, the driver has a symmetry of revolution.

The fluid valve according to the invention makes it possible to distribute a fluid flow rate between two ways (e.g. two outlets) proportionally, i.e. 50%-50%, by means of a low power control signal which can be sent by a computer. The fluid valve of the invention can be used with different fluids such as, for example: oil, engine oil, fuel. The fluid valve of the invention could be used with other fluids. Preferably, the fluid valve of the invention comprises one or more filters or anti-pollution devices (e.g. seals, leakage paths) to reduce the risk of blockage of the valve member. The fluid valve of the invention can be used in a hydraulic circuit of a piece of equipment of an aircraft such as, for example, the hydraulic circuit of a landing gear.

The inventors also propose a hydraulic circuit for a piece of equipment of an aircraft (e.g. hydraulic circuit of a landing gear), a fuel cell system, a turbomachine and an aircraft comprising one or more fluid valves according to the invention.

BRIEF DESCRIPTION OF THE FIGURES

These and other aspects shall be clarified in the detailed description of particular embodiments of the invention, reference being made to the drawings of the figures, in which:

FIG. 2 shows another embodiment of said fluid valve; The drawings of the figures are not to scale. Generally, similar elements are denoted by similar references in the figures. The presence of reference numbers in the drawings cannot be considered as limiting, even when such numbers are indicated in the claims.

DETAILED DESCRIPTION OF CERTAIN EMBODIMENTS OF THE INVENTION

Figure 1:
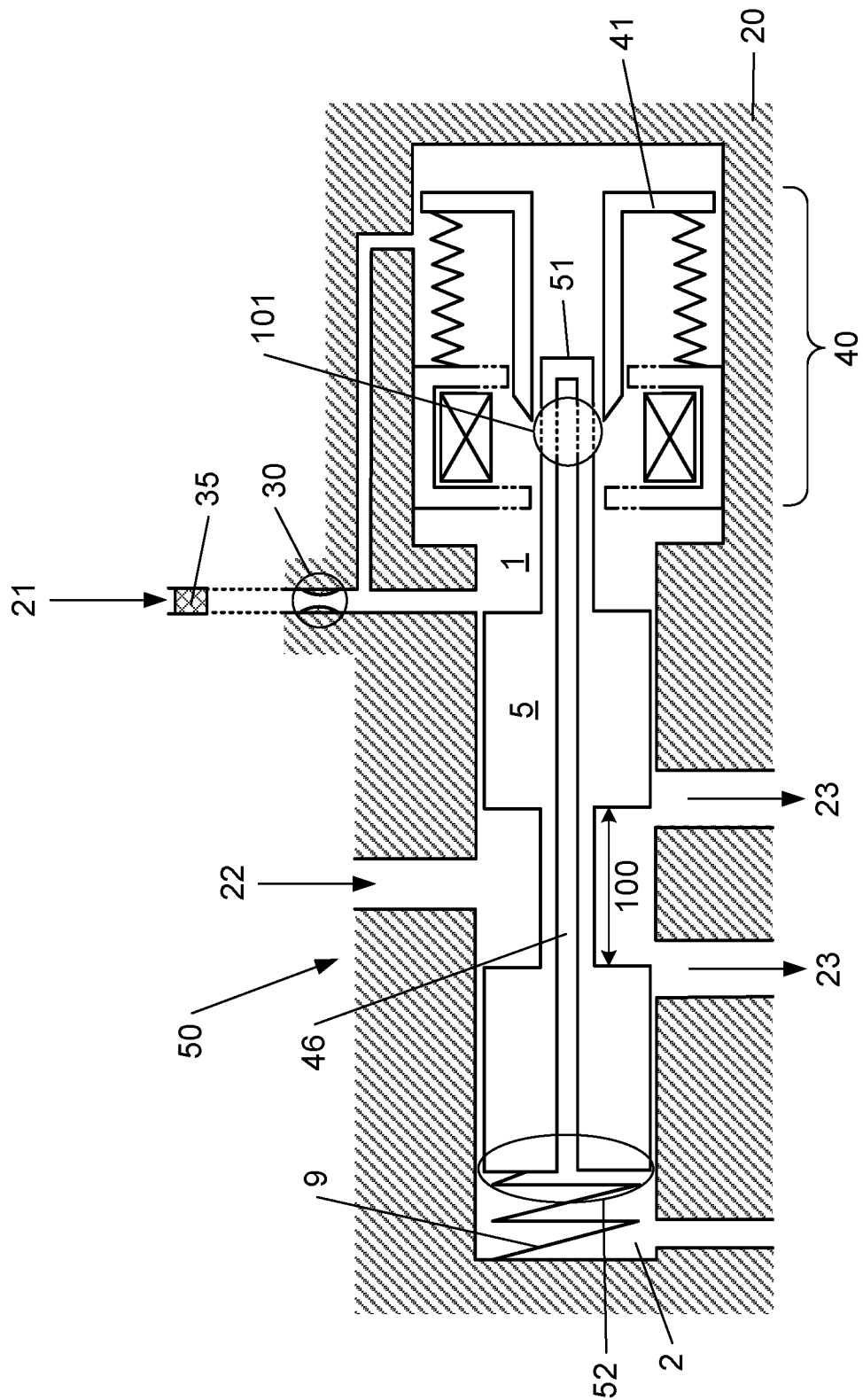
FIG. 1 shows a possible embodiment of the fluid valve of the invention.

FIG. 1 shows an example of the embodiment of the fluid valve 50 according to the invention. It comprises a hollow valve body 20 and a three ways: one inlet 22 and two outlets 23. Preferably, the left-hand outlet 23 is a by-pass outlet, a term known to a person skilled in the art. Preferably, the right-hand outlet 23 is a engine outlet. The valve member 5 or slide is mobile in the hollow valve body 20. The shape of the valve member 5 with respect to the hollow of the hollow valve body 20 is such that a variation in the position of the valve member makes it possible to vary a fluid flow rate between the inlet 22 and one or both outlets 23. As shown in FIG. 1, one end of the valve member 5 is preferably connected or linked to the valve body 20 via a spring 9. The valve member 5 defines a first cavity 1 on its right and a second cavity 2 on its left at the spring 9. The second cavity 2 is preferably pressurized at the downstream pressure as shown in FIG. 1. The pressure in the first cavity 1 is adjusted via a communication 21 to a reference pressure (or external pressure), which here is a high pressure, and via a variable restriction controlled by the position of driver 41 relative to the position of the valve member 5. The communication 21 to the external pressure comprises a restriction 30. The communication 21 has two points of communication with the first cavity 1 to ensure a good pressure distribution in the first cavity 1.

The fluid valve 50 also comprises a solenoid electric actuator 40 comprising a coil and a ferromagnetic mobile driver 41. By injecting an electric current into the coil of the electric actuator 40, the ferromagnetic driver 41 generally moves to decrease the reluctance (a term known to a skilled in the art) or equivalent to the overall magnetic energy. A spring connecting the driver 41 to the solenoid actuator 40 is, for example, a compression spring, which allows the driver 41 to return to an initial position when no current is applied to the solenoid actuator coil. Thus the fluid valve of the invention allows good control of the position of the driver 41.

For the example in FIG. 1, when an electrical current flows through the coil of the solenoid actuator, the driver 41 moves to the left, decreasing the communication between the first cavity 1 and the outlet of the side communication 101 of the longitudinal cavity 46 of the valve member 5. The pressure in the first cavity 1 then increases as the driver 41 prevents pressure equalization between the first cavity 1 and the second cavity 2 via the longitudinal orifice 46. Since the pressure of the second cavity 2 is lower than the pressure in the first cavity 1, a pressure difference occurs between the first 1 and second 2 cavities. This pressure difference applies to mobile elements such as the driver 41 and the valve member 5. Because the driver 41 is thus completely within the first cavity 1, the driver 41 does not feel any effect of a pressure variation in the first cavity. However, the resulting pressure difference is applied to the valve member 5 and induces a leftward displacement force on the valve member 5; if this displacement force is large enough, the valve member 5 will move to the left. If the high pressure or external pressure via the communication 21 decreases, i.e. the pressure in the first cavity 1 decreases, the force applied by the solenoid actuator 40 remains constant because it depends only on the current flowing through its coil. However, this will induce a modification in the degree of communication between the side openings 101 and the driver 41, i.e. the variable restriction so that a balance of forces on the valve member 5 is re-established.

FIG. 1 shows a two-driver proportional balanced valve and comprising a spring-loaded feedback system 9. The spring 9 is connected between a fixed wall of the valve body 20 and the second end 52 of the valve member 5. The purpose of the spring 9 in the feedback system is to eliminate vibrations of the valve member 5 as it attempts to reach a position of equilibrium, i.e. a balance of forces acting on it. Thus, when the valve member 5 is in equilibrium, i.e., the forces on its first end 51 and its second end 52 cancel each other out, the spring 9 applies some force on the second end of the valve member 5. During a displacement of the driver 41 to the left, the pressure in the first cavity will tend to increase due to the closure of the variable restriction 101, which tends to push the valve member 5 to my left. A displacement of the valve member 5 to the left then causes the variable restriction 101 to reopen, allowing the pressure in the first cavity 1 to decrease until the forces on the valve member 5 balance. Thus, the spring 9 allows to maintain a nearly constant force on the valve member 5 in any position to prevent the oscillation of the valve member 5 during its displacement.

During a displacement of the driver 41 to the right, i.e., a lower current than previously applied is applied to the solenoid actuator coil 40. Thus, the communication between the longitudinal cavity 46 and the first cavity 1 via the side openings 101 is increased, resulting in a pressure drop in the first cavity 1 and, consequently, the valve member 5 is subjected to a displacement force toward the right, causing a reduction in the variable restriction allowing the communication between the first 1 and second 2 cavities until the forces applied to the valve member 5 are at equilibrium. In this embodiment, the advantage of the configuration of such a variable restriction is that the plunger (driver) 41 is never subjected to the pressure differences between the two cavities 1, 2 allowing for a well-balanced, fast and accurate fluid valve.

FIG. 2 shows another embodiment of the invention and, in particular, another embodiment of the feedback acting on the second end 52 of the valve member 5.

The fluid valve 50 further comprises a third cavity 71 fluidly connected to a third pressure, e.g. an external HP pressure, by means of a third communication 27. Preferably, the third communication 27 allows the third pressure to prevail in the third cavity 71. The third cavity 71 is preferentially located in the hollow of the valve body 20.

The fluid valve 50 further comprises a piston 60 having a first part 60*a* and a second part 60*b*. The first part 60*a* is attached to the valve member 5 in the second cavity 2. The second part 60*b* is located at least partially in the third cavity 71. Preferably, the first part 60*a* of the piston 60 is wider than the second part 60*b* of the piston 60, and preferably the piston 60 slides in a fifth communication 29 between the second 2 and the third 71 cavities. The piston 60 is preferably immersed, for example, in an oil-like viscous fluid.

In an embodiment of the invention, the first part 60*a* of the piston 60 is fixed to the valve member 50 at its second end 52 around the longitudinal cavity 46 and the first part 60*a* is drilled by channels 61 putting the second cavity 2 and the longitudinal cavity 46 in fluid communication. This allows the forces resulting from the pressures on the piston 60 to be aligned with the left-to-right displacement of the valve member 5 in the main direction 100 and the pressure in the second cavity 2 also prevails in the longitudinal cavity 46.

According to an embodiment, the fluid valve 50 can be operated as follows:

In the first cavity 1, when an electrical actuation moves the driver 41 to the left, the side opening 101 of longitudinal cavity 46, in which the pressure LP prevails, is further blocked. The pressure in the first cavity 1 is then increased by the first communication 21. This increase in pressure increases the force pushing the valve member 5 to the left.

Conversely, at the first cavity 1, when an electrical actuation moves the driver 41 to the right, the side opening 101 of longitudinal cavity 46, in which the pressure LP prevails, is less blocked. The pressure in the first cavity 1 then decreases. This pressure decrease reduces the force which pushes the valve member 5 to the left.

At the second cavity 2, the force pushing valve member 5 to the right comes from (i) the force due to the pressure HP that prevails in the third cavity 71 and being applied on the second part 60*b* of the piston 60, and (ii) the force due to the pressure LP that prevails in the second cavity 2 and being applied on the first part 60*a* of the piston 60 and on the valve member 5.

The position of the valve member 5 is thus determined by the balance between the forces being applied to the left at the first cavity 1 and to the right at the second cavity 2.

It is of particular interest that the first communication 21 and the third communication 27 are connected to the same external pressure, because if the external pressure changes, the pressures in the first cavity 1 and the third cavity 71 change in the same direction. Thus, the forces to the left and right also increase in the same direction and the position of the valve member 5 is only slightly influenced by this increase in external pressure.

In FIGS. 1 and 2, the solenoid electric actuator 40 is positioned in the hollow of the valve body 20. The solenoid electric actuator 40 is positioned around a portion of the driver 41 and a ferromagnetic portion of the valve member 5. The solenoid electric actuator 40 surrounds a portion of the driver 41 and a ferromagnetic portion of the valve member 5. Preferably, the solenoid electric actuator 40 is positioned around the side communications 101 of the longitudinal cavity 46 of the valve member 5, during normal operation of the valve 50. For example, the side communications 101 of the longitudinal cavity 46 of the valve member 5 are located in the ferromagnetic portion of the valve member 5. For example, the first end 51 of the valve member 5 is included in the ferromagnetic portion of the valve member 5. When a current is injected into the solenoid electric actuator 40, the magnetic circuit formed by the solenoid electric actuator 40, the driver 41, and the valve member 5 (when the injected current is sufficient) generates a displacement force for moving the driver 41 relative to the valve member 5 or vice versa.

The present invention has been described in relation to specific embodiments, which are purely illustrative and should not be considered as limiting. Generally speaking, the present invention is not limited to the examples illustrated and/or described above. The use of the verbs "consist", "include", "comprise", or any other variant, as well as their conjugations, can in no way exclude the presence of elements other than those mentioned. The use of the indefinite article "an", "a", or the definite article "the", to introduce an element does not exclude the presence of a plurality of such elements. The reference numbers in claims shall not limit their scope.

In summary, the invention may also be described as follows.

A fluid valve 50 for a hydraulic system of an aircraft and comprising:
  a valve body 20 comprising an inlet 22, two outlets 23;
  an solenoid electric actuator 40 comprising a ferromagnetic mobile driver 41;
  said valve member 5 having a portion comprising a ferromagnetic material:
    comprising a first 51 and a second 52 ends,
    defining a first 1 and second 2 cavities located on either side of the valve member 5 and comprising a longitudinal cavity 46 extending parallel to a main direction 100 and opening into said second cavity 2,
  such that a relative displacement between the mobile driver 41 and the valve member allows a communication between the longitudinal cavity 46 and the first cavity 1 to be modified via a side opening 101 perpendicular to the main direction 100.

The invention claimed is:

1. A fluid valve for a hydraulic circuit of a piece of equipment of an aircraft and comprising:
  a hollow valve body comprising an inlet, two outlets and a first communication to an external pressure;
  a fixed restriction in said first communication,
  a solenoid electric actuator located in the hollow of the hollow valve body and comprising a ferromagnetic mobile driver; and
  a valve member movable in translation within the valve body along a main direction to at least partially block a passage between said inlet and one of the two outlets, said valve member
    comprising first and second ends,
    at least partially defining first and second cavities located on either side of said valve member in the hollow of the valve body, said first and second cavities being adjacent to said first and second ends, respectively, said first cavity being connected to said external pressure via said first communication, and
    comprising a longitudinal cavity extending parallel to said main direction and opening into said second cavity,
  wherein at least one portion of the valve member comprises a ferromagnetic material, the solenoid electric actuator surrounding at least one portion of the valve member for one or more positions of said valve member during normal operation of the valve, in that
  said valve member comprises at least one side opening substantially perpendicular to said main direction and putting in communication said longitudinal cavity with said first cavity, said longitudinal cavity not opening into said first cavity at its first end, and in that
  the fluid valve is configured such that a relative displacement between said mobile driver and said valve member modifies a communication between said longitudinal cavity and said first cavity via said at least one side opening.

2. The fluid valve according to claim 1, wherein the solenoid electric actuator surrounds said at least one portion of the valve member comprising a ferromagnetic material, for one or more positions of said valve member during normal operation of the valve.

3. The fluid valve according to claim 1, wherein the fluid valve is configured such that a pressure force applied on the mobile driver in a direction parallel to the main direction results solely from a pressure within the first cavity.

4. The fluid valve according to claim 1, further comprising:
  a third cavity having a second communication fluidly connecting the third cavity to a third pressure, and
  a piston mechanically coupled to the valve member and having a first part and a second part, the first part being in the second cavity, and the second part being located at least partially in the third cavity, so that a displacement of said mobile driver induces a pressure variation in the first cavity to create a displacement force on said valve member to vary a fluid flow rate between the inlet and the two outlets.

5. The fluid valve according to claim 4, wherein the third cavity is located in the hollow of the valve body.

6. The fluid valve according to claim 1, wherein a displacement of the mobile driver in one direction of said main direction modifies said communication between said longitudinal cavity and said first cavity via said at least one side opening causing pressure variations in said first and second cavities to generate a displacement of said valve member in said direction.

7. The fluid valve according to claim 1, wherein the solenoid electric actuator comprises at least one coil, and in that a portion of said mobile driver located between said valve member and said at least one coil substantially defines a bevelled shape, so that the mobile driver selectively modifies said communication between said longitudinal cavity and said first cavity via said at least one side opening.

8. The fluid valve according to claim 1, further comprising a spring, wherein the second end of said valve member is connected to said valve body via said spring.

9. The fluid valve according to claim 1, wherein said driver is connected to a spring.

10. The fluid valve according to claim 1, wherein the first communication opens into the first cavity.

11. The fluid valve according to claim 1, further comprising a spring connecting said driver to said solenoid actuator so that said force of said spring is adapted to at least partially change said communication between said longitudinal cavity and said first cavity via said at least one side opening.

12. A hydraulic circuit for a piece of equipment of an aircraft comprising a fluid valve according to claim 1.

13. A fuel cell system comprising a fluid valve according to claim 1.

14. A turbomachine for an aircraft comprising a fluid valve according to claim 1.

15. An aircraft comprising a fluid valve according to claim 1.

* * * * *